United States Patent [19]
Shimizu et al.

[11] Patent Number: 5,350,166
[45] Date of Patent: Sep. 27, 1994

[54] SHEET SEPARATING MECHANISM AND METHOD OF FLEXING A SHEET TO FACILITATE SEPARATION FROM A STACK

[75] Inventors: Satoshi Shimizu; Tomohiro Kudo, both of Yokohama; Kenichi Suzuki, Isehara, all of Japan

[73] Assignee: Canon Kabushiki Kaisha, Tokyo, Japan

[21] Appl. No.: 82,167

[22] Filed: Jun. 28, 1993

Related U.S. Application Data

[63] Continuation of Ser. No. 727,121, Jul. 9, 1991, abandoned.

[30] Foreign Application Priority Data

Jul. 13, 1990 [JP] Japan ................. 2-186270
Jun. 5, 1991 [JP] Japan ................. 3-134212

[51] Int. Cl.⁵ ........................... B65H 5/08
[52] U.S. Cl. ........................ 271/14; 271/20; 271/91; 271/106
[58] Field of Search ............ 271/11, 20, 91, 103, 271/104, 106, 14

[56] References Cited

U.S. PATENT DOCUMENTS

| | | |
|---|---|---|
| 3,048,391 | 8/1962 | Spiess ................. 271/26 |
| 4,218,054 | 8/1980 | Bauer et al. ........... 271/106 X |
| 4,354,336 | 10/1982 | Azzaroni ............... 53/505 |
| 4,509,736 | 9/1985 | Stahl et al. ........... 271/106 X |
| 5,097,496 | 3/1992 | Madate . | |

FOREIGN PATENT DOCUMENTS

| | | | |
|---|---|---|---|
| 3610660 | 4/1987 | Fed. Rep. of Germany ........ 271/11 |
| 52-838 | 4/1980 | Japan ................. 271/104 |
| 11440 | 1/1983 | Japan ................. 271/106 |
| 188341 | 8/1986 | Japan ................. 271/20 |
| 198932 | 8/1990 | Japan ................. 271/11 |
| 286529 | 11/1990 | Japan ................. 271/106 |
| 1402394 | 6/1988 | U.S.S.R. .............. 271/91 |
| 2071061 | 9/1981 | United Kingdom . | |

*Primary Examiner*—Robert P. Olszewski
*Assistant Examiner*—Boris Milef
*Attorney, Agent, or Firm*—Fitzpatrick, Cella, Harper & Scinto

[57] ABSTRACT

Disclosed is a mechanism for separating a sheet one by one from stacked sheets, wherein a sucker is rotatably supported so that the sucker is moved up and down, back and forth. When the sucker is retracted in a state where the sheet is being sucked, the sucker is caused to be rotatively driven and to change the direction of suction surface, so that a front end portion of sucked sheet is lifted up, and one sheet can be separated reliably one by one.

19 Claims, 16 Drawing Sheets

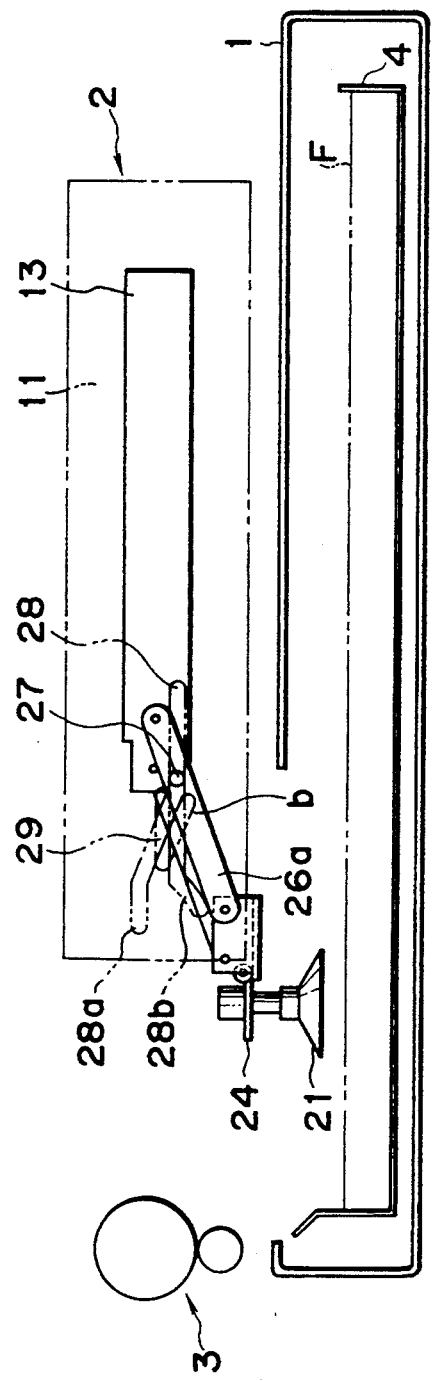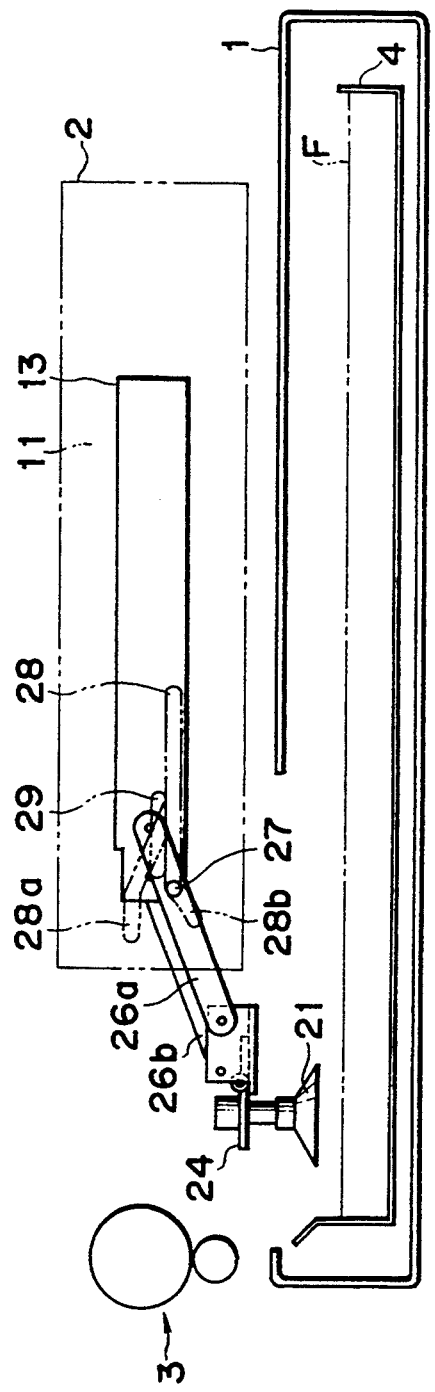

F I G. 10
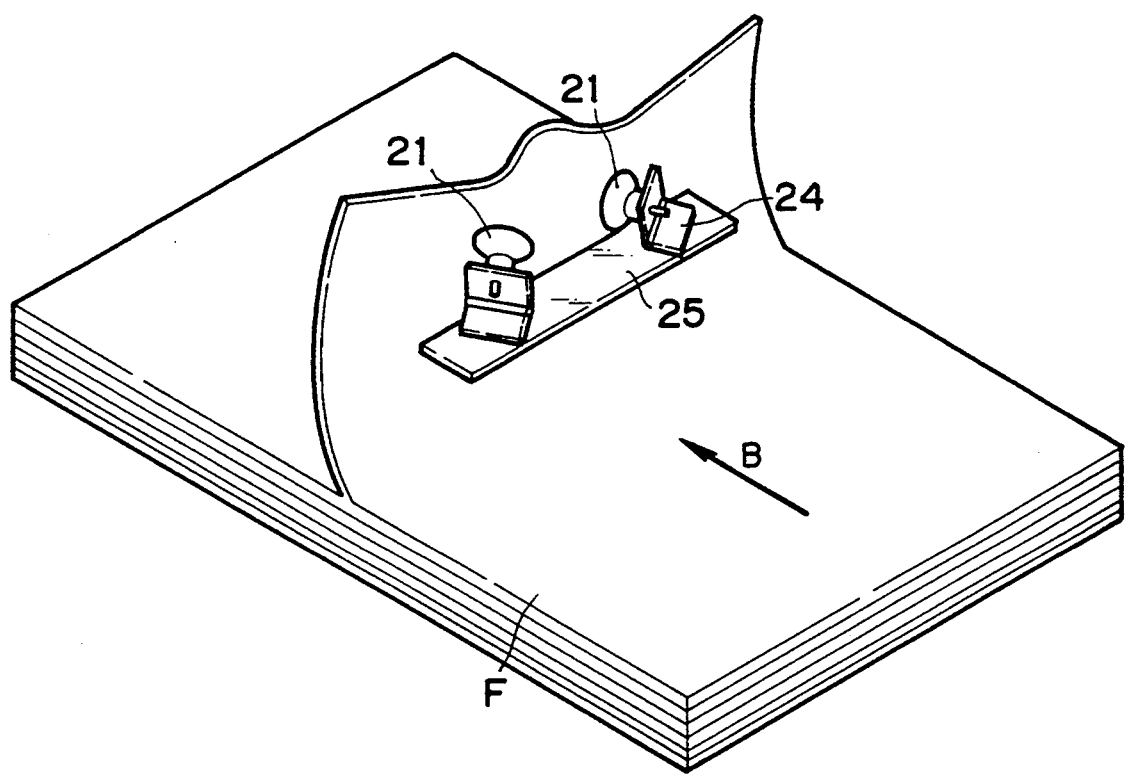

SHEET SEPARATING MECHANISM AND METHOD OF FLEXING A SHEET TO FACILITATE SEPARATION FROM A STACK

This application is a continuation of application Ser. No. 07/727,121 filed Jul. 9, 1991, now abandoned.

BACKGROUND OF THE INVENTION

1. Field of the Invention

The present invention relates to a sheet separation mechanism for use with a system which can record or photograph an image onto a sheet film, for example.

2. Related Background Art

Conventionally, a sheet separating mechanism of this type has been widely used for an image recording system such as a printer or photographing apparatus, and various mechanisms have been well known. FIG. 25 shows one example of a conventional sheet separating mechanism, wherein a sucker S is disposed above sheet films F stacked in a case C within a magazine M, and is moved backward in a direction of arrow A in parallel after lifting up one sheet by suction. As a result, a back end of lifted sheet film comes into contact with the case C and is bent, as shown, in FIG. 25, whereby the uppermost sheet lifted by the sucker S is separated and held, and further conveyed to the next step by moving the sucker S consecutively.

However, in such a conventional method, undue force is applied on the sucker during separating operation of a sheet film, so that there is a problem that the sheet film may be dropped since the film sheet is not held by suction any longer, or some traces caused by pressure may remain on the sheet film. Also, there is a problem that a second sheet film lifted up by closely adhering to the upper-most sheet film can not be returned to original position within the case, and when a next sheet film is attempted to supply, it can not be sucked correctly because there is no sheet film in a predetermined position.

SUMMARY OF THE INVENTION

An object of the present invention is to provide a sheet separating mechanism which can extract a sheet one by one easily and reliably from many sheets stacked therein, with a relatively simple mechanism. A further object of the present invention is to provide a system using the above mechanism.

BRIEF DESCRIPTION OF THE DRAWINGS

FIGS. 4 to 8 and FIG. 11 are explanation views for the operation sequence.

FIG. 10 is an explanation view for the action of the sucker.

DETAILED DESCRIPTION OF THE PREFERRED EMBODIMENTS

FIRST EMBODIMENT

Figure 1:
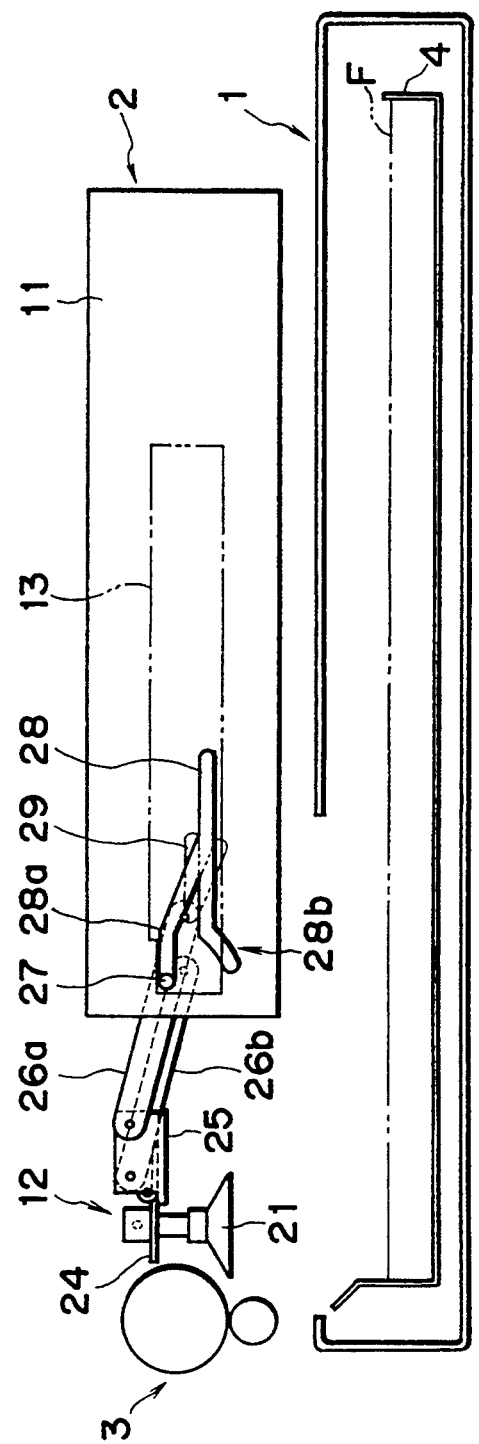
FIG. 1 is a front view of a first embodiment according to the first present invention.
Figure 2:
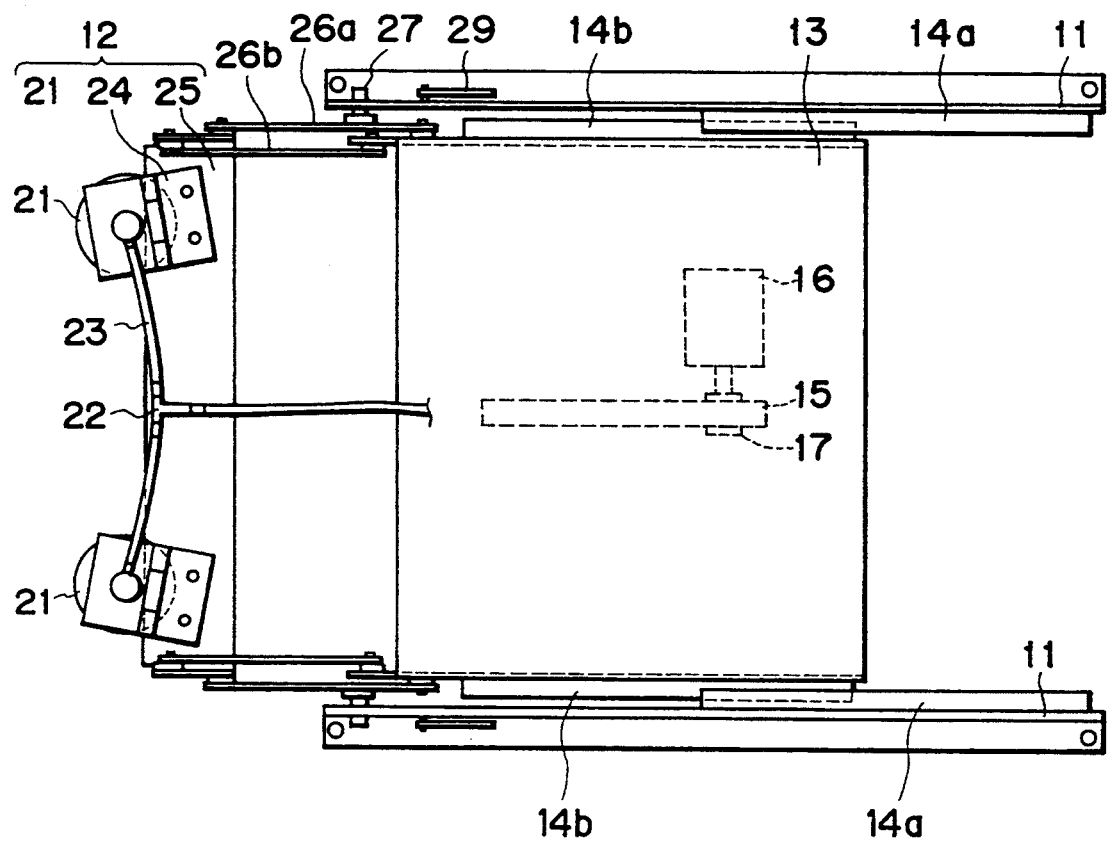
FIG. 2 is a plan view of the embodiment.

A first embodiment of the present invention will be described in detail with reference to FIGS. 1 to 11. FIG. 1 is a front view of the embodiment in which the present invention is applied to a sheet film supply apparatus, and FIG. 2 is a plan view thereof. A supply magazine 1 contains a large number of sheet films F stacked therein. With a sheet separation mechanism 2, sheet films are taken out one by one by suction through an opening portion of the supply magazine 1, and with a pair of conveying rollers 3, the sheet film taken out is fed to the next process such as an image recording or photographing portion.

The sheet separation mechanism 2 is generally constructed of frames 11, sucker units 12, and a slide board 13 movable back and forth for controlling the position of the sucker units 12. The slide board 13 is supported to be freely movable back and forth in parallel by slide rails 14a, 14b provided on the frames 11 of both side as shown in FIG. 2. On a lower surface of the slide board 13 is provided a rack 15. The slide board 13 is driven back and forth through a pinion gear 17 engaged with the rack 15 by a motor 16 fixed on the frames 11. The back and forth position of the slide board 13 can be detected by detection means (not shown). In the sucker units 12, two suckers 21 are connected to a hose 23 through a joint 22, and sucked by a pump (not shown). The pressure within the hose 23 can be detected by a pressure sensor so as to judge whether or not the sheet film is sucked. The suckers 21 are attached to a support plate 25 through respective hinges 24, wherein the support plate 25 is constructed so that arms 26a, 26b form the parallel link on both sides of the support plate 25, thereby moving while always maintaining the parallel state. Outside of the arm 26a is projected a guide pin 27, which is fitted into a guide slot 28 provided on the frames 11 to regulate the height of support plate 25. The guide slot 28 is branched into two guide slots 28a, 28b with different heights in front thereof, wherein the proceeding direction of the guide pin 27 can be determined by switching the position of a guide bar 29 attached to the frame 11 to a or b.

Figure 3A:
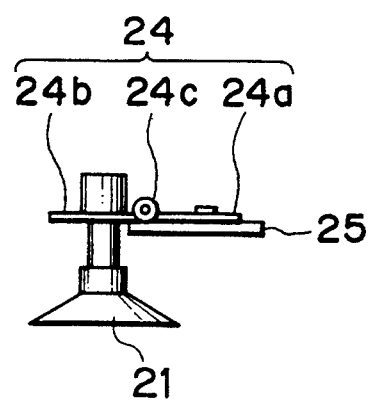
FIGS. 3A and 3B are explanation views for the operation of a sucker.
Figure 3B:
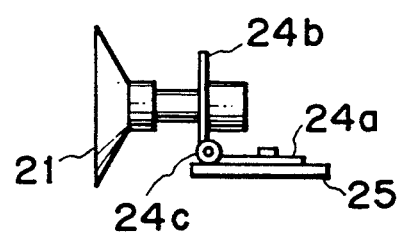

As shown in FIGS. 3A and 3B, the hinge 24 having the sucker 21 attached thereto includes one hinge plate 24a fixed to the support plate 25, and the other hinge plate 24b having the sucker 21 secured thereto. The hinge plate 24b having the sucker 21 secured thereto is rotatable about 90 degrees around a hinge shaft 24c directed horizontally from a position as shown in FIG. 3A to a position as shown in FIG. 3B since the hinge plate 24b is biased in a counterclockwise direction by the gravity or a spring force at all times, it is supported stably at a position where it abuts on the support plate 25, i.e., a position as shown in FIG. 3A. That is, the support plate 25 is used as a stopper against which the sucker 21 can not be rotated in a direction opposite to that of taking out the sheet.

Figure 6:
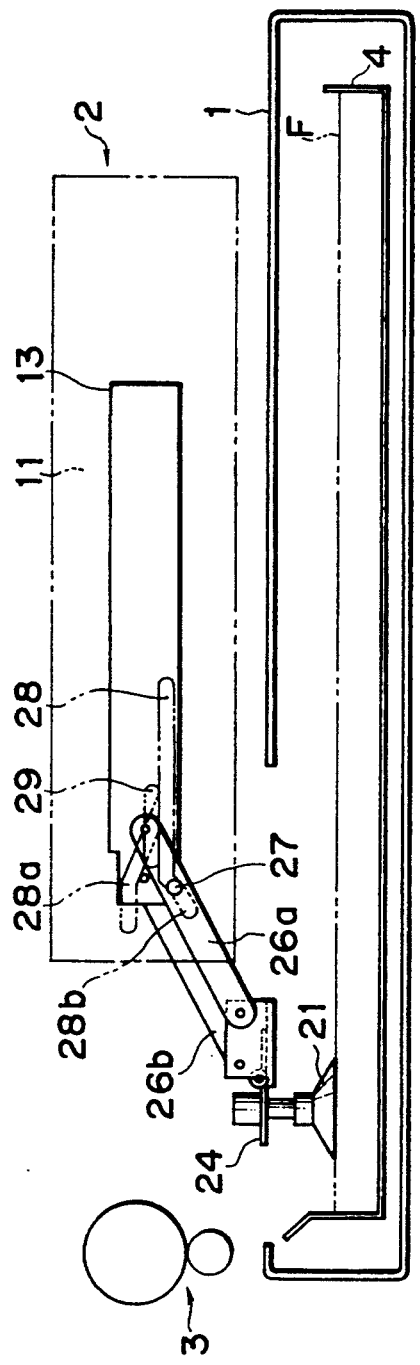
Figure 7:
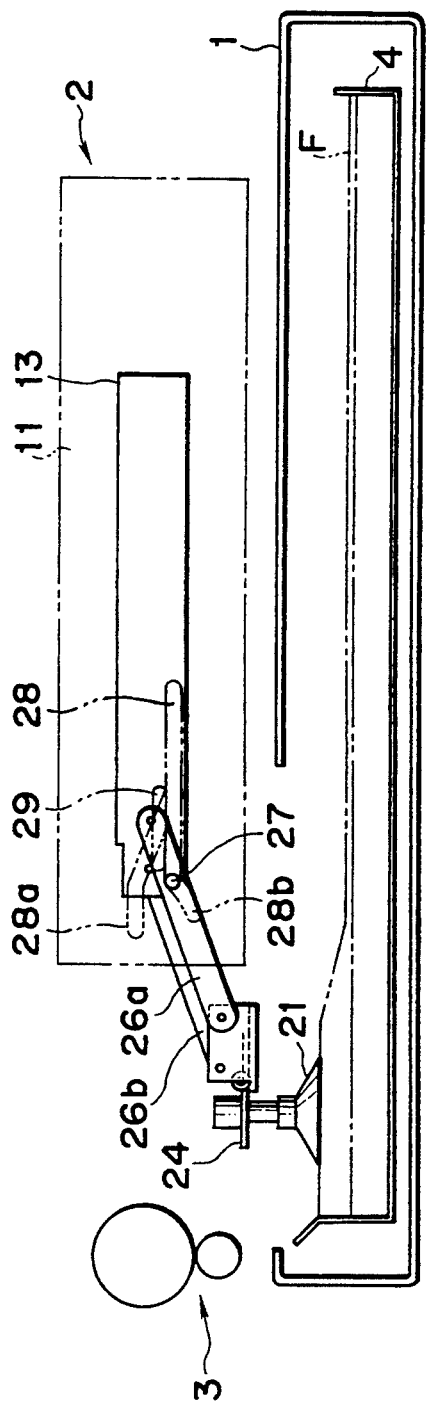
Figure 8:
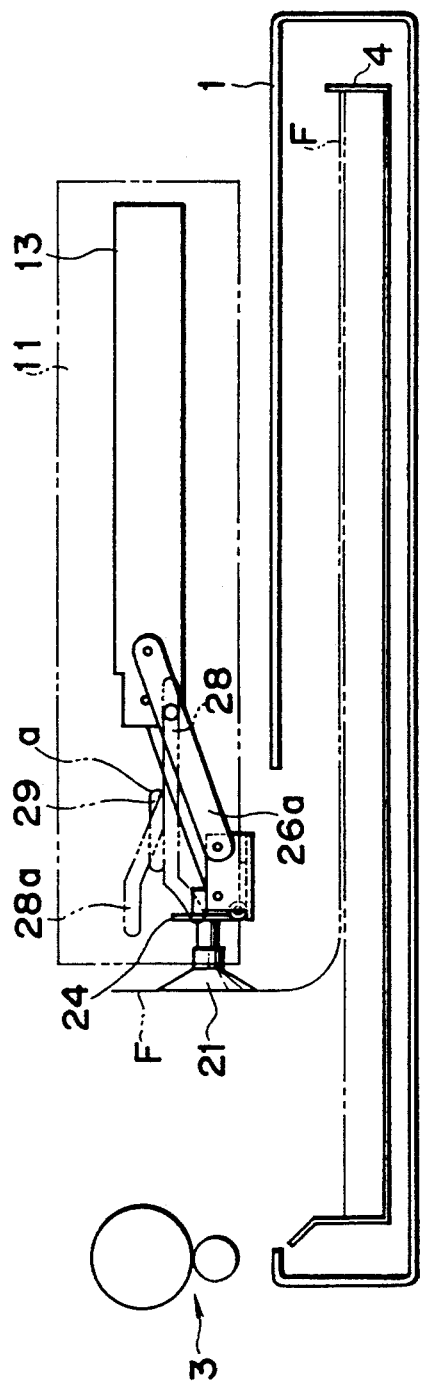

Next, the operation with the above constitution will be described. First, the sucker 21 is placed at a position as shown in FIG. 1. In this position the suction is started with the pump. Then, if the slide board 13 is retracted by the motor 16, the sucker 21 is moved from a position as shown in FIG. 1 to a position as shown in FIG. 4. Thus, with driving means such as a solenoid (not shown), the guide bar 29 is shifted from b to a position. If the slide board 13 is progressed by reversing the rotation of the motor 16, the guide pin 27 proceeds to a branch guide slot 28b, and the sucker 21 falls down through a position as shown in FIG. 5 until the sucker 21 comes into contact with the sheet film F as shown in FIG. 6, thereby sucking the upper-most sheet film. If the sucker 21 sucks the sheet film, the pressure within the hose 23 is decreased, so that a signal is generated if the detection output of a pressure sensor is below a predetermined pressure. With this signal, the motor 16 is rotated reversely again, whereby the slide board 13 is retracted and the sucker 21 rises up to a position as shown in FIG. 7. If the slide board 13 is further retracted substantially in parallel to a direction of stacking sheet films, the sucker 21 is rotated substantially 90 degrees, as shown in FIG. 8, to change the direction of sucked plane and raise an end portion of the lifted sucked film sheet. That is, as a back end of sheet film abuts on a wall of a case 4, the sucker 21 and the hinge 24 are rotatively driven so that sucked sheet film may take the most natural shape with the result that a front end of sheet film is directed upward and bent. Even if a second sheet film adheres to the upper-most sheet film sucked by the sucker 21, the second and following sheet films can be restored to their original positions within a supply magazine 1, due to restoring force of the sheet film to the original state. Accordingly, the sucker 21 can suck only the upper-most one sheet.

The total height of sheet films stacked is different depending on a number of sheet films contained within the supply magazine 1, wherein a flexure of sheet film is made equal by changing the amount of retracting the slide board 13 in accordance with the number of sheet films. That is, if the number of sheet films is small, the amount of retracting the slide board 13 is increased so that the flexure of sheet film can be held constant. Also, it is contemplated that the height of raising the sucker 21 is changed in correspondence with the total height of sheet films stacked. With such a constitution in which driving parameters of driving means are changed in accordance with the total height of stack, it is possible to take out the sheet more reliably, irrespective of the residual amount of sheets. As the method of detecting the total height of sheet films stacked, there are methods of estimating the total height from the residual number of sheets while counting the number of films sucked, or detecting the total height with an optical or mechanical sensor, or a method as proposed in U.S. patent application Ser. No. 672,634 filed on Mar. 20, 1991. Also, if the detected total height of stack is below a predetermined value, an alarm signal for indicating insufficient remaining sheets can be created to prompt the operator to supplement sheets.

Figure 9:
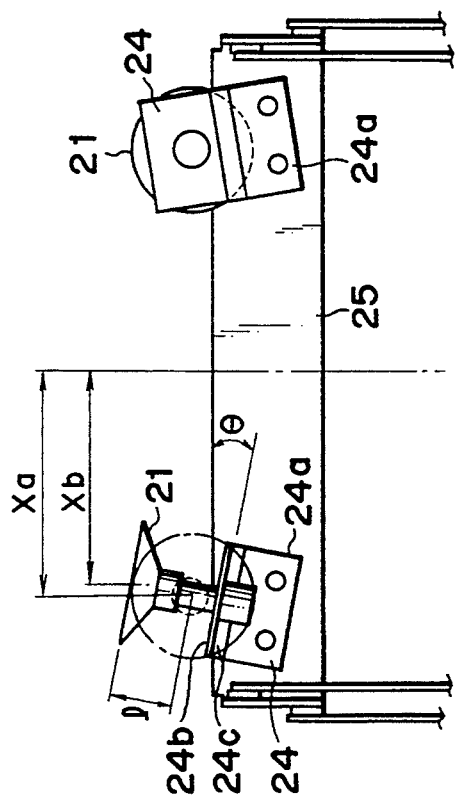
FIG. 9 is a plan view of an example for mounting the sucker.

In this embodiment, in order to separate only one sheet more reliably, the two hinges 24 are mounted so that the hinge shafts 24c are inclined by an angle $\theta$ in a horizontal direction with respect to one side of sheet film perpendicular to a proceeding direction of sheet film, as shown in FIG. 9. In this way, there is a difference between the distances $x_a$, of the sucker 21 placed in a normal state as indicated by the two-dot chain line to the center and the distance $x_b$ of the sucker 21 in a stood-up state as indicated by the solid line to the center. For example, in FIG. 9, for $l=20$ mm and $\theta=10$ degrees, the difference d of such distances between the sucker 21 and the center is $$d = x_a - x_b = l \cdot \sin \theta = 3.5 \text{ mm}$$

and in a state where the hinge plate 24b is stood up as shown in FIG. 8, the distance between two suckers 21 is less about 7 mm than that in a suction state as shown in FIG. 6, so that the sheet film is flexed not only in a proceeding direction B but also in a direction perpendicular to that proceeding direction as shown in FIG. 10. As a result, the air is more likely to enter between sheet films closely contacted, thereby further increasing the effect of separation.

Figure 11:
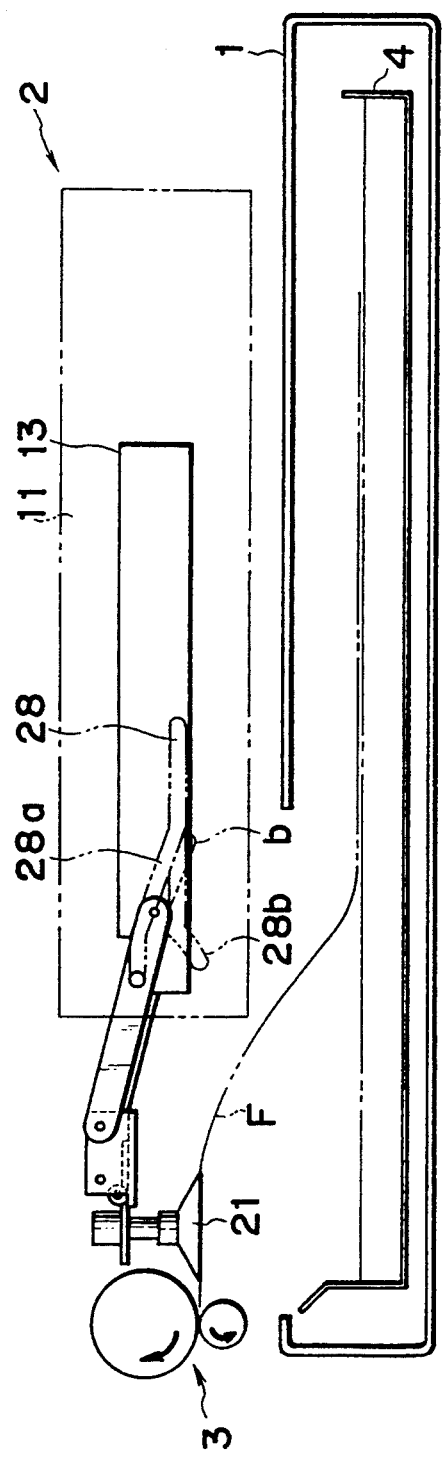

After the upper-most one sheet is separated in the above manner, the guide bar 29 is returned from b to a position to progress the slide board 13 with the motor 16. If the support plate 25 is progressed, a front end of sucked sheet film is gradually returned from a lifted-up state to a horizontal state. Also, the guide pin 27 proceeds to the branch guide slot 28b and is raised while progressing the sucker unit 12, and if it moves up to a position as shown in FIG. 11, the front end of sucked sheet film is inserted between a pair of conveying rollers 3. Then, the suction of the pump is stopped and the pair of conveying rollers 3 starts to be rotated in a direction of arrow shown in FIG. 11, whereby the sheet film is conveyed to the next process such as an image recording or photographing section. And a number of sheet films stacked within the supply magazine 1 is separated one by one and sequentially supplied to the next process.

While in the above example, two suckers 21 are arranged in parallel to one side of sheet film perpendicular to its proceeding direction, it is noted that its number may be either single or plural. Also, while in the above embodiment the sucker is moved substantially in parallel to a direction of stacking sheet films to rotate the sucker, the same separation action can be obtained if the sucker is moved in a direction of having at least this component. The film and magazine are not limited to a disposition in a horizontally held state, as described in the embodiment, but can be placed in an obliquely inclined state to perform the extraction reliably, as will be described later and shown in FIG. 24.

SECOND EMBODIMENT

Figure 12:
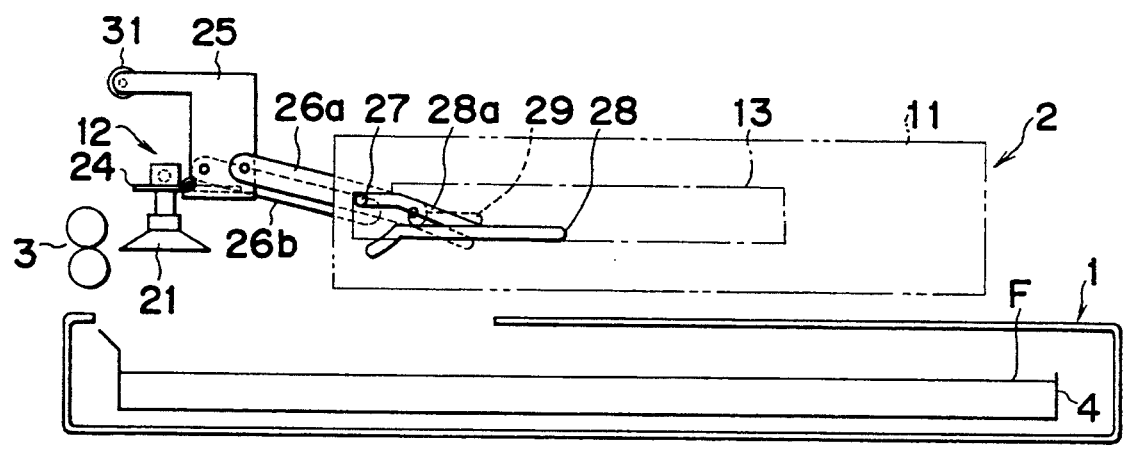
FIG. 12 is a front view of a second embodiment according to the present invention.
Figure 13:
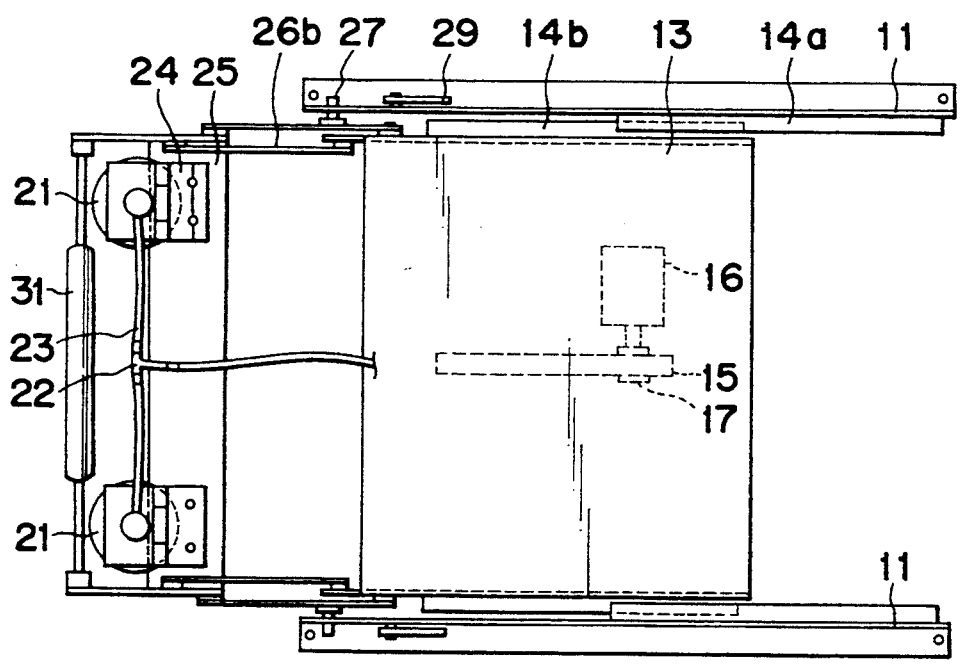
FIG. 13 is a plan view of the second embodiment.

Another embodiment will be described below. FIG. 12 is a front view of this second embodiment, and FIG. 13 is a plan view thereof. A supply magazine 1 contains a large number of sheet films F stacked therein. With a sheet separation mechanism 2, one sheet film is taken out one by one by suction through an opening portion of the supply magazine 1, and with a pair of conveying rollers 3, the sheet film taken out is fed to the next process such as an image recording or photographing portion.

The sheet separation mechanism 2 is generally constructed of frames 11, sucker units 12, and a slide board 13 movable back and forth for controlling the position of the sucker units 12. The slide board 13 is supported to be freely movable back and forth in parallel by slide rails 14a, 14b provided on the frames 11 of both sides as shown in FIG. 13. On a lower surface of the slide board 13 is provided a rack 15. The slide board 13 is driven back and forth through a pinion gear 17 engaged with the rack 15 by a motor 16 fixed on the frames 11. The back and forth position of the slide board 13 can be detected by detection means (not shown). In the sucker units 12, two suckers 21 are connected to a hose 23 through a joint 22, and sucked by a pump (not shown). The pressure within the hose 23 can be detected by a pressure sensor so as to judge whether or not the sheet film is sucked. The suckers 21 are attached to a support plate 25 through respective hinges 24, wherein the support plate 25 is constructed so that arms 26a, 26b form the parallel link on both sides of the support plate 25, thereby moving while always maintaining the parallel state. Outside of the arm 26a is projected a guide pin 27, which is fitted into a guide slot 28 provided on the frame 11 to regulate the height of support plate 25. The guide slot 28 is branched into two guide slots 28a, 28b with different heights in front thereof, wherein the proceeding direction of the guide pin 27 can be determined by switching the position of a guide bar 29 attached to the frame 11 to a or b. Between both side plates of the support plate 25, a contact bar 31 is extended. The contact bar 31 includes portions having smaller shaft diameter, the portions substantially corresponding to two suckers 21, respectively, as shown in FIG. 13. The length of the portion having the smaller shaft diameter is substantially the same as the diameter of the sucker 21. Convex end portions of the contact shaft 31 having a larger shaft diameter, other than the portions having the smaller shaft diameter, are subjected to the R finishing so as not to damage the film even if the film is slid thereon.

Figure 14A:
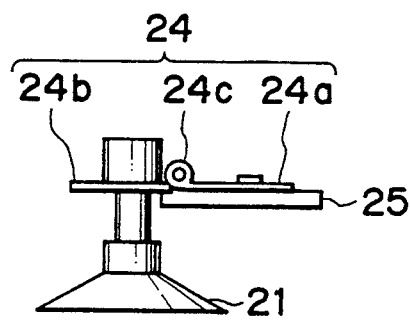
FIGS. 14A and 14B are explanation views for the operation of the sucker.
Figure 14B:
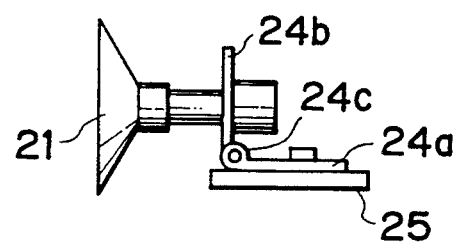

As shown in FIGS. 14A and 14B, the hinge 24 having the sucker 21 attached thereto includes one hinge plate 24a fixed to the support plate 25, and the other hinge plate 24b having the sucker 21 secured thereto. The hinge plate 24b having the sucker 21 secured thereto is rotatable about 90 degrees around a hinge shaft 24c directed horizontally from a position as shown in FIG. 14A to a position as shown in FIG. 14B. Since the hinge plate 24b is biased in a counterclockwise direction by the gravity or a spring force at all times, it is supported stably at a position where it abuts on the support plate 25, i.e., a position as shown in FIG. 14A. That is, the support plate 25 is used as a stopper against which the sucker 21 can not be rotated in a direction opposite to that of taking out the sheet.

Figure 15:
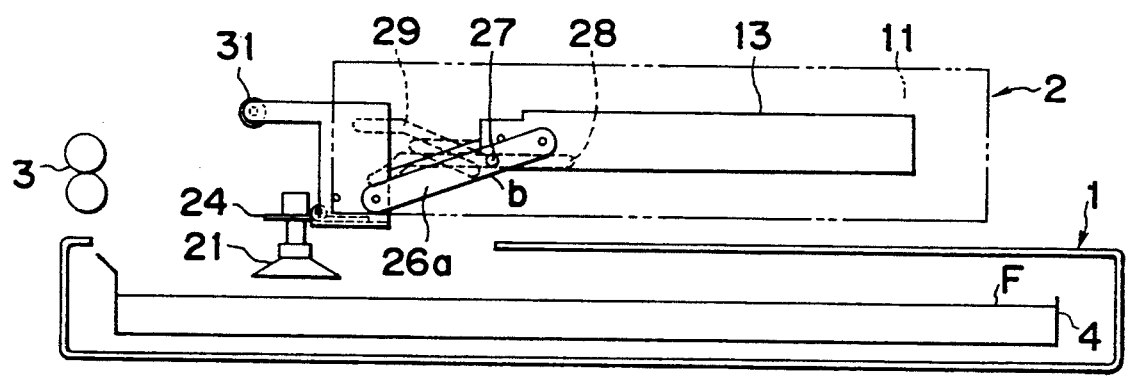
FIGS. 15 to 21 are explanation views for the operation sequence.
Figure 16:
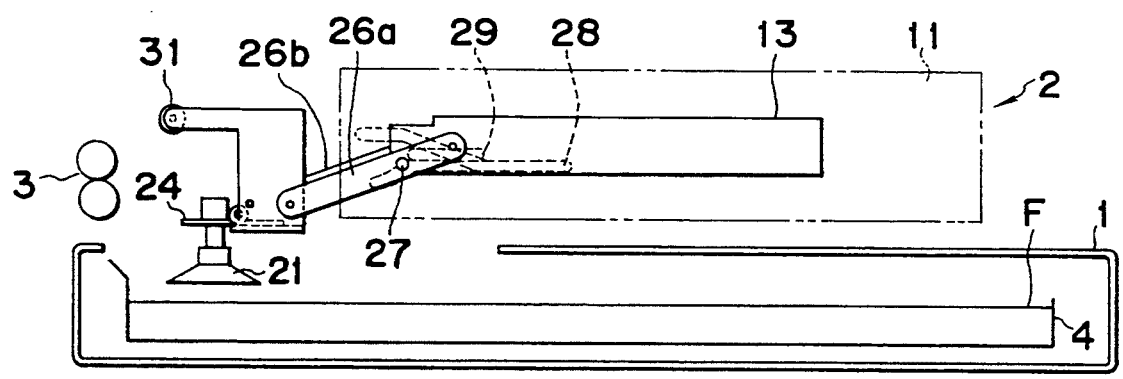
Figure 17:
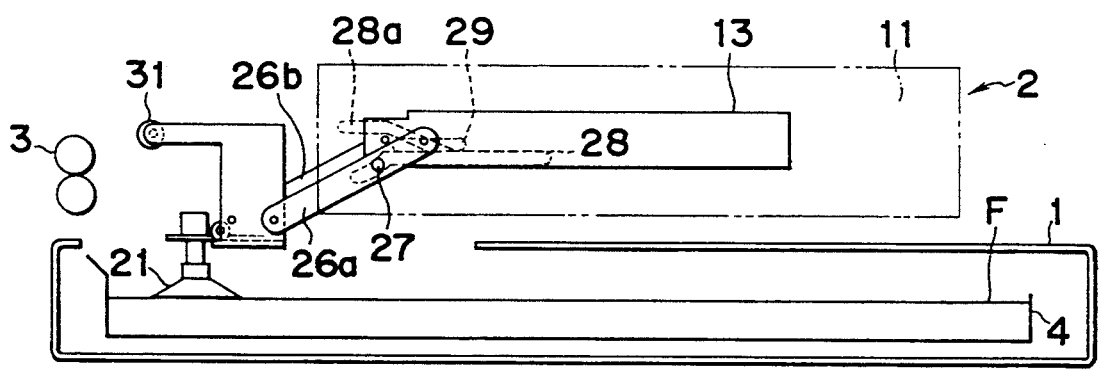
Figure 18:
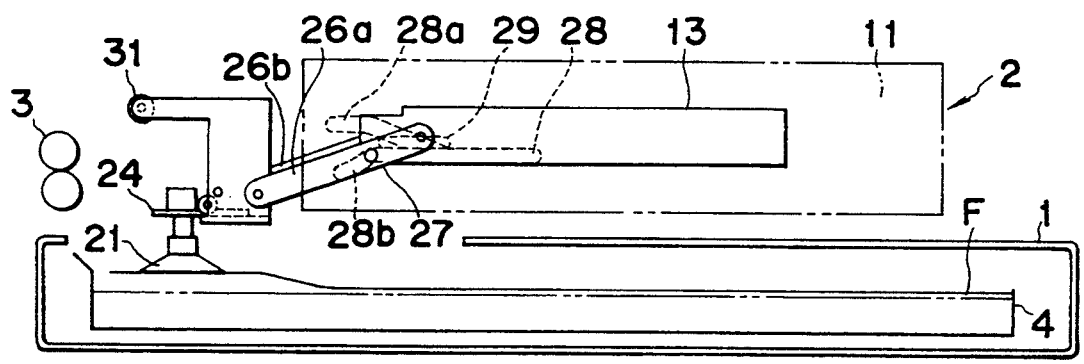
Figure 19:
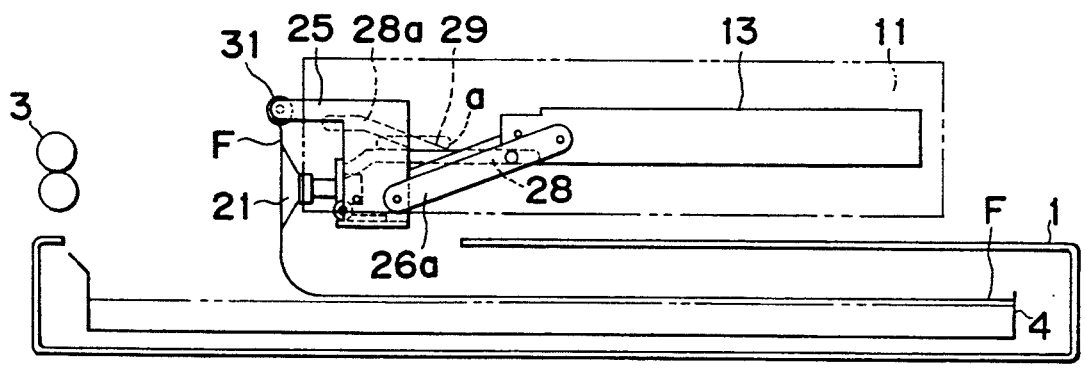

Next, the operation with the above construction will be described. First, the sucker 21 is placed at a position as shown in FIG. 12. In this position the suction is started with the pump. Then, if the slide board 13 is retracted by the motor 16, the sucker 21 is moved from a position as shown in FIG. 12 to a position as shown in FIG. 15. Thus, with driving means such as a solenoid (not shown), the guide bar 29 is shifted from b to a position. If the slide board 13 is progressed by reversing the rotation of the motor 16, the guide pin 27 proceeds to a branch guide slot 28b, the sucker 21 falls down through a position as shown in FIG. 16 until the sucker 21 comes into contact with the sheet film F as shown in FIG. 17, thereby sucking the upper-most sheet film. If the sucker 21 sucks the sheet film, the pressure within the hose 23 is decreased, so that a signal is generated if the detection output of a pressure sensor is below a predetermined pressure. With this signal, the motor 16 is rotated reversely again, whereby the slide board 13 is retracted, and the sucker 21 is stood up to a position as shown in FIG. 18. If the slide board 13 is further retracted substantially in parallel to a direction of stacking sheet films, the sucker 21 as shown in FIG. 19 is rotated substantially 90 degrees to change the direction of sucked plane and raise an end portion of sucked sheet film. That is, as a back end of sheet film abuts on a wall of a case 4, the sucker 21 and the hinge 24 are rotatively driven so that the sucked sheet film may take the most natural shape with the results that a front end of sheet film is directed upward and bent. With this bent operation, the second and following sheet films are mostly separated therefrom due to the restoring force, and some measures are taken to further increase the separation action. In said first embodiment, a front end of sheet lifted up is flexed by inclining the hinge shaft as shown in FIG. 9, but in this embodiment, the separation action can be further increased with another means to obtain the same action.

Figure 20:
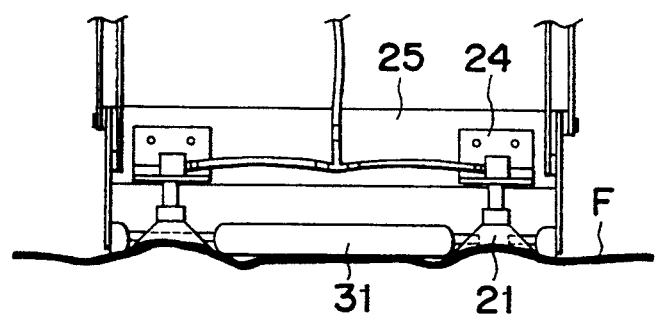

More specifically, a front end of lifted sheet film F as shown in FIG. 19 first comes into contact, in parallel, with a portion of the contact bar 31 having larger shaft diameter. The sheet film F can take the shape as shown in FIG. 20 when the sucker 21 (slide board 13) is further retracted. That is, since the shaft diameter of the contact bar 31 is small to form concave where the neighborhood of a portion of the sheet film is sucked by the sucker 21, its portion of the sheet film is bent inward along the concave portion, and owing to its reaction, end portions of the convex portion of the contact shaft 31 having larger shaft diameter are bent in a direction of leaving away from the shaft 31. By bending the front end portion of the sheet film lifted up like a corrugation around the portion having smaller shaft diameter, the air is more likely to enter between closely disposed sheet films, particularly near the sucker portions having stronger contact force, so that the separation action can be further increased.

The total height of sheet films stacked is different depending on a number of sheet films contained within the supply magazine 1, wherein a flexure of sheet film is made uniform by changing the amount of retracting the slide board 13 in accordance with the number of sheet films. That is, when the number of sheet films is small, the amount of retracting the slide board 13 is increased so that the flexure of sheet film can be held constant. Also, it is possible to provide such a mechanism that the height of raising the sucker 21 is changed depending on the total height of sheet films stacked therein. With a constitution of changing the driving parameter of driving means in accordance with the total height of stack, it is possible to take out the sheet more reliably irrespective of the remaining amount of sheets. As the methods of detecting the total height of sheet films stacked, there are methods of estimating the total height from the residual number of sheets while counting the number of films, or detecting the total height with an optical or mechanical sensor. Also, it can be considered that if the detected total height of stack is below a predetermined value, an alarm signal for indicating insufficient remaining sheets is created to prompt the operator to supplement sheets.

Figure 21:
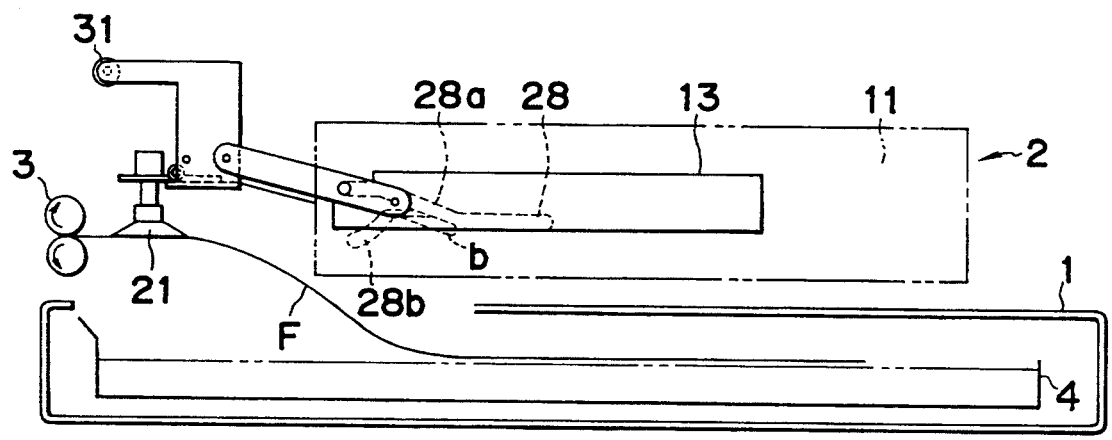

After the upper-most one sheet is separated in the above manner, the guide bar 29 is returned from b to a position to progress the slide board 13 with the motor 16. If the support plate 25 is progressed, a front end of sucked sheet film is gradually returned from a lifted state to a horizontal state. Also, the guide pin 27 proceeds to the branch guide slot 28b and is raised while progressing the sucker unit 12, and if it moves up to a position as shown in FIG. 21, the front end of sucked sheet film is inserted between a pair of conveying rollers 3. Then, the suction of the pump is stopped and the pair of conveying rollers 3 starts to be rotated in a direction of arrow, whereby the sheet film is conveyed to the next process such as an image recording or photographing section. And a number of sheet films stacked within the supply magazine 1 is separated one by one and sequentially supplied to the next process.

While in the above example, two suckers 21 are arranged in parallel to one side of sheet film perpendicular to its proceeding direction, it is noted that its number may be either single or plural, wherein if the shaft diameter of a portion of the contact bar 31 corresponding to a sucker portion of the sucker is made smaller, the same action effect can be obtained. Also, while in the above embodiment the sucker is moved substantially in parallel to a direction of stacking sheet films to rotate the sucker, the same separation action can be obtained if the sucker is moved in a direction of having at least this component. Also, as in the above embodiment the film and magazine are not limited to a disposition in a horizontally held state, but can be placed in an obliquely inclined state to perform the extraction reliably, as will be described later and shown in FIG. 24.

Embodiment of system using the above mechanism

Figure 22:
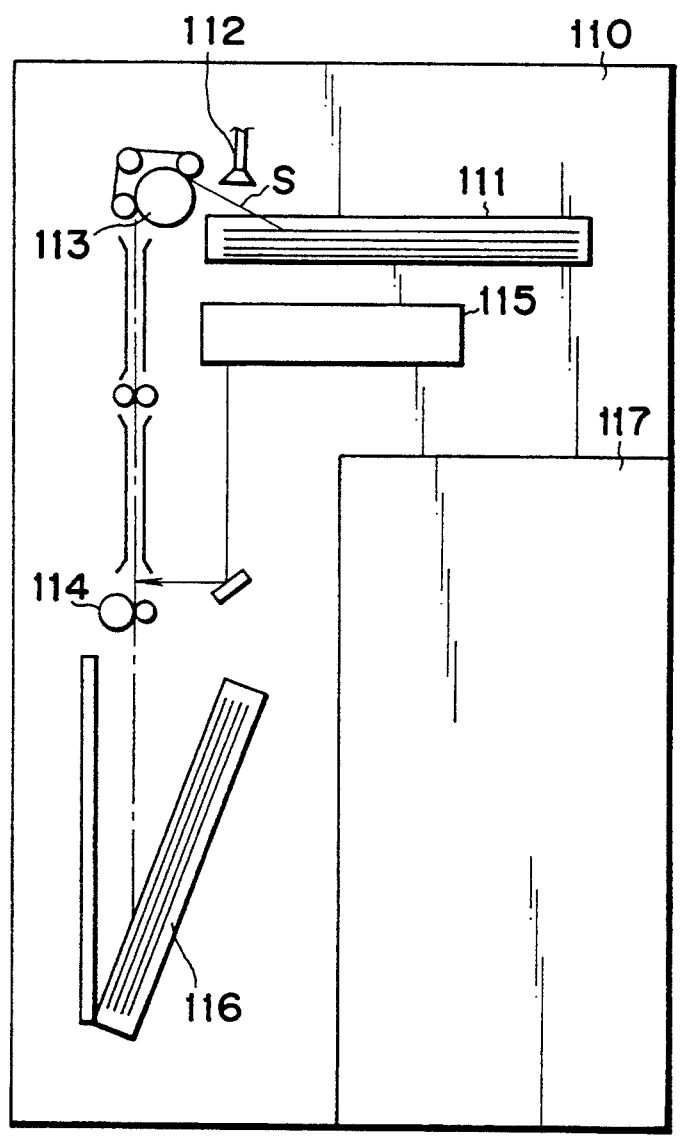
FIG. 22 is a constitutional view for an example of a laser printer.

The above extraction mechanism can be applied to an image photographing apparatus or printing machine as well as sheet film separating supply mechanism of an image recording apparatus such as printer or copying machine. As one example, there is shown a specific example in which the above extraction mechanism is applied to a laser printer system for recording images onto a silver halide film using the laser beam. FIG. 22 is a view for illustrating the inside of a laser printer. 110 denotes an apparatus body of the laser printer, and within a supply magazine 111 are stacked a large number of unused films. A sucker 112 operates in the same mechanism as above to take out a film. If the remaining amount of films is less than a predetermined number, an alarm is generated to the operator. A front end of one sheet S sucked and taken out by the sucker 112 is brought into a conveying mechanism having a conveying roller 113, and then the sheet S is conveyed along a path. On a way of the path is provided a sub-scanning roller 114, in the vicinity of which a main scan is performed with a laser beam from an optical unit 115. The optical unit 115 includes a polygon mirror for scanning the laser beam from a laser light source, and further, modulating means for modulating the laser beam in accordance with a record signal. An image is exposed and recorded by making the main scan on the film to be conveyed in a sub-scan direction with the modulated laser beam emitted from the optical unit 115. The recorded film falls down by its own weight to be contained within a receive magazine 116. Numeral 117 denotes a controller unit including a control circuit for controlling the whole apparatus or a power source.

Figure 23:
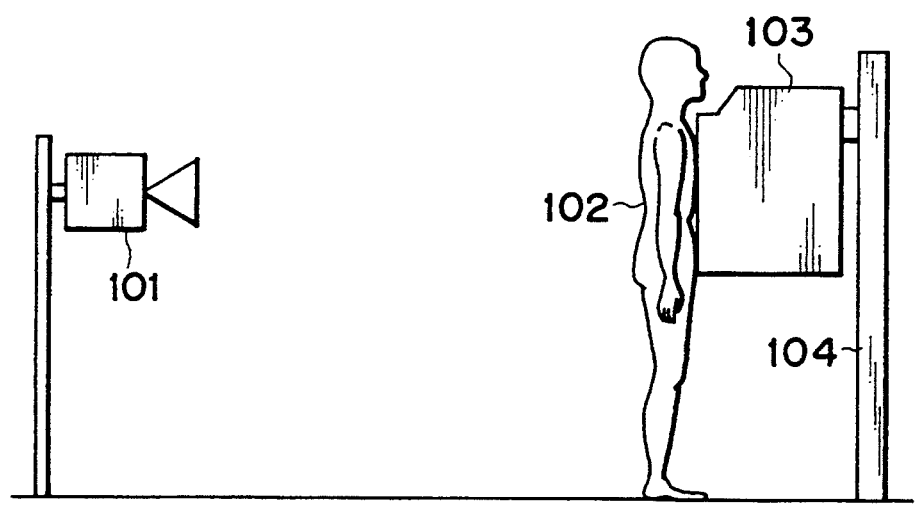
FIGS. 23 and 24 are constitutional views for an example of X-ray photography system.
Figure 24:
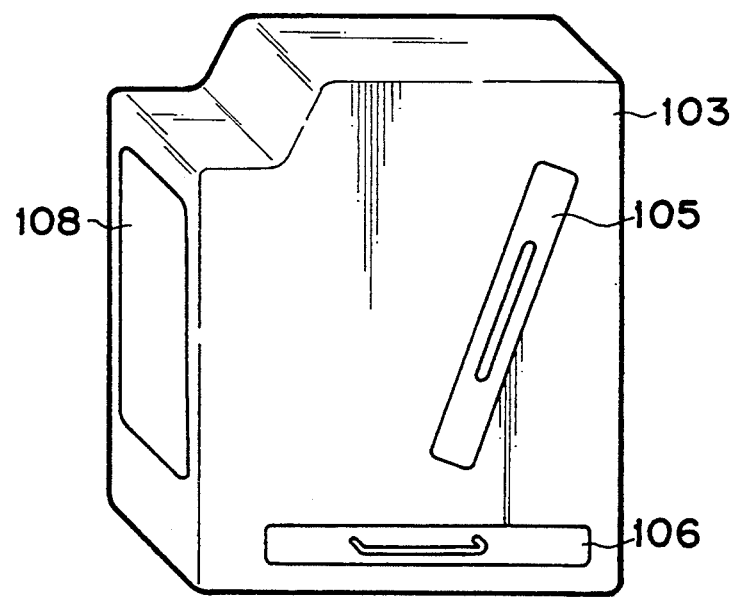
Figure 25:
FIG. 25 is a front view of a conventional example.

Next, as another example, there is shown an example in which the above extraction mechanism is applied to an X-ray system for examining a breast of a subject. FIG. 23 is a view showing schematically the X-ray photography system for taking an X-ray photograph for examining the breast of a subject. Numeral 101 denotes an X-ray tube which produces X-rays for photography, 102 is a subject, 103 is an X-ray photographing apparatus, and 104 is a frame for supporting the X-ray photographing apparatus. FIG. 24 is an external appearance view of the X-ray photographing apparatus 103 as shown in FIG. 23. Numeral 105 denotes a magazine for containing unused X-ray films, and 106 is a magazine for containing used films, each magazine being attached to the X-ray photographing apparatus as shown in FIG. 24. Within the apparatus is provided the sheet extraction mechanism as above described (not shown), for taking out the sheet film one by one from the uppermost position of unused X-ray films stacked within the magazine 105 disposed obliquely relative to the gravitational direction. Also, numeral 108 denotes a breast plate on which the subject places his breast closely thereto. Within the breast plate 108 is provided a photograph stage for setting a photograph film. One film taken out from the magazine 105 by the extraction mechanism is conveyed to the photograph stage by a conveying mechanism (not shown). And then, an X-ray image of subject's breast can be transferred onto the film by exposure with X-rays in a state where the X-ray film is held in the photograph stage. The exposed film is stored within the magazine 106 by the conveying mechanism (not shown).

We claim:

1. A mechanism for separating a sheet, comprising:
   a suction unit;
   a magazine for storing stacked sheets;
   a support moving in a first direction substantially parallel with the stacked sheets while rotatably supporting said suction unit; and
   a regulating member for regulating movement of the sheet in the first direction to give flexure to the sheet being held by said suction unit in response to movement of the support in the first direction, said suction unit being rotated in a second direction by the flexure of the sheet to separate at least a part of the sheet from the stacked sheets.

2. A mechanism according to claim 1, further comprising a conveyance mechanism for conveying the sheet from said magazine.

3. A mechanism according to claim 2, further comprising a plurality of suction units, each suction unit holding the sheet as said support is moved in the first direction.

4. A mechanism according to claim 1, further comprising a contact member for giving flexure to a separated part of the sheet when said suction unit is rotated in the second direction.

5. A mechanism according to claim 4, wherein said contact member is arranged at both sides of the suction unit, and said contact member gives flexure between a part of the sheet held by the suction unit and surrounding parts of the sheet.

6. A mechanism according to claim 1, wherein an amount of movement of said support in the first direction is changed according to the height of the sheets stacked in said magazine.

7. A mechanism according to claim 1, wherein the sheets stacked in said magazine are silver halide film sheets.

8. An image formation system comprising:
   a suction unit;
   a magazine for storing stacked sheets;
   a support moving in a first direction substantially parallel with the stacked sheets while rotatably supporting said suction unit;
   a regulating member for regulating movement of the sheet in the first direction to give flexure to the sheet being held by said suction unit in response to movement of said support in the first direction, said suction unit being rotated in a second direction by the flexure of the sheet to separate at least a part of the sheet from the stacked sheets;

a conveyance mechanism for conveying the sheet from said magazine; and an image formation means for forming an image on the sheet conveyed by said conveyance mechanism.

9. A system according to claim 8, wherein said magazine stores sensitive film sheets as the stacked sheets.

10. A system according to claim 9, wherein said image formation means records an image on the sensitive film by optical scanning.

11. A system according to claim 9, wherein said image formation means includes photographing means for photographing an image of an object on the sensitive film.

12. A system according to claim 11, wherein said image formation means utilizes X-rays passed through the object.

13. A method for separating a sheet, comprising the steps of:

separating one sheet using a suction unit from sheets stacked in a magazine, the suction unit being supported rotatably by a support;

moving the support in a first direction substantially parallel with the stacked sheets while rotatably supporting the suction unit; and regulating movement of the sheet in the first direction by a regulating member to give flexure to the sheet being separated by the suction unit in response to movement of the support in the first direction, the suction unit being rotated in a second direction by the flexure of the sheet to separate at least a part of the sheet from the stacked sheets.

14. A method according to claim 13, further comprising the step of conveying the sheet from the magazine by a conveyance mechanism.

15. A method according to claim 13, wherein a plurality of suction units hold the sheet when the support moves in the first direction.

16. A method according to claim 13, wherein flexure is given to a separated part of the sheet by a contact member when the suction unit rotates in the second direction.

17. A method according to claim 13, wherein movement of the support in the first direction varies with the height of the sheets stacked in the magazine.

18. A sheet separating apparatus for separating a sheet from stacked sheets stored in a magazine, comprising:

a suction unit;

a support movable in a first direction substantially parallel with the stacked sheets stored in the magazine while rotatably supporting said suction unit; and a regulating member for regulating movement of the sheet in the first direction to give flexure to the sheet being held by said suction unit in response to movement of the support in the first direction, said suction unit being rotated in a second direction by the flexure of the sheet to separate at least one sheet from the stacked sheets.

19. A mechanism according to claim 3, wherein shafts for supporting each of said plurality of suction units are provided, wherein each said shaft is directed in a slightly different direction to give some flexure to a front end portion of the sheet when said suction units are rotated.

* * * * *

UNITED STATES PATENT AND TRADEMARK OFFICE
CERTIFICATE OF CORRECTION

PATENT NO. : 5,350,166
DATED : September 27, 1994
INVENTOR(S) : SATOSHI SHIMIZU, ET AL.

It is certified that error appears in the above-indentified patent and that said Letters Patent is hereby corrected as shown below:

On the Title Page, item [56], under "FOREIGN PATENT DOCUMENTS", "52-838 4/1980 Japan" should read --55-52838 4/1989 Japan--.

<u>Column 1</u>,
 line 25, "shown," should read --shown--;
 line 52, "first" should be deleted; and
 line 53, "the embodiment." should read --the first embodiment.--.

<u>Column 6</u>,
 line 23, "concave" should read --concave portion--.

<u>Column 10</u>,
 line 32, "flexture" should read --flexure--.

Signed and Sealed this

Twenty-eight Day of February, 1995

*Attest:*

BRUCE LEHMAN

*Attesting Officer*   *Commissioner of Patents and Trademarks*